Dec. 12, 1939.  G. G. BENNETT  2,182,838
LOADING MACHINE
Filed June 18, 1938
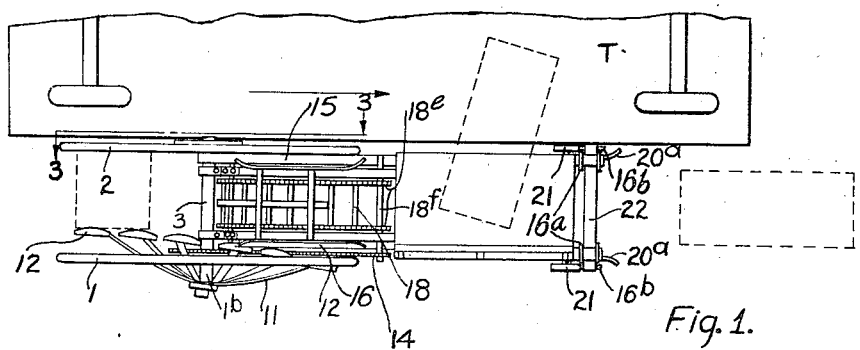
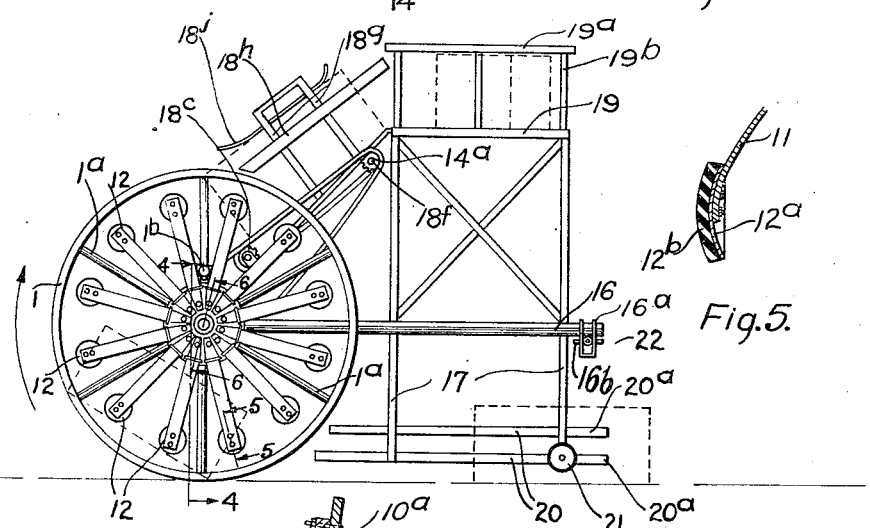
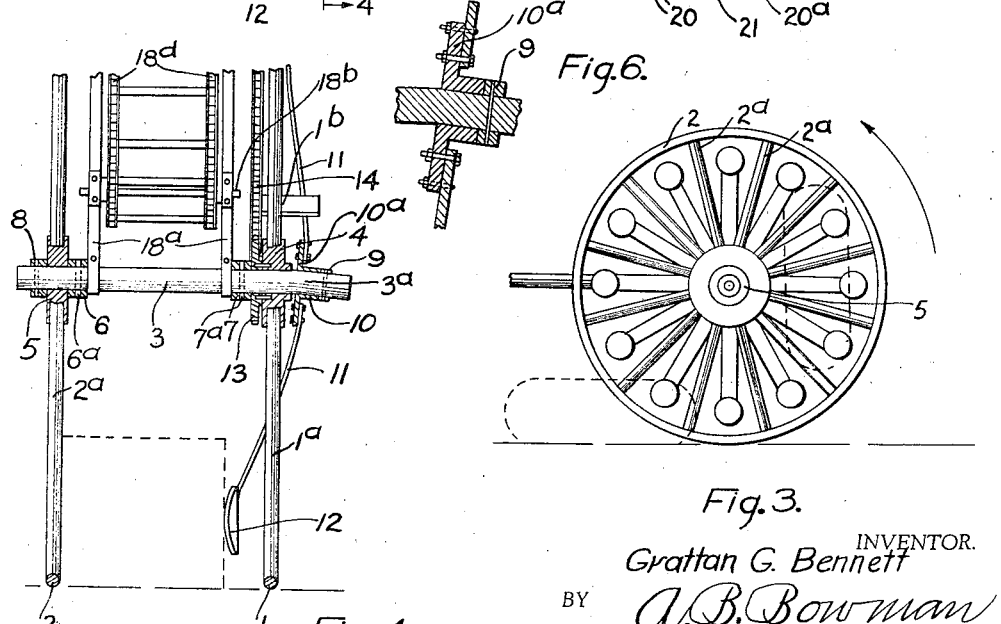
INVENTOR.
Grattan G. Bennett
BY A. B. Bowman
ATTORNEY.

Patented Dec. 12, 1939

2,182,838

UNITED STATES PATENT OFFICE 2,182,838

LOADING MACHINE

Grattan G. Bennett, Heber, Calif.

Application June 18, 1938, Serial No. 214,498

11 Claims. (Cl. 214—77)

My invention relates to a loading machine, more particularly to machines for loading bags of grain, baled hay or the like from the ground in a field onto a truck to which my machine is attached, and the objects of my invention are:

First, to provide a machine of this class which will readily pick up and elevate to a position level with the platform of a truck or above the same such flexible objects as a sack of grain or similar objects;

Second, to provide such a machine which is also applicable for picking up and elevating more rigid objects such as baled hay or similar objects;

Third, to provide a machine of this class which will readily pick up such objects when positioned in rows in spaced relation to each other;

Fourth, to provide a machine of this class with novel means for picking up objects and elevating them;

Fifth, to provide a machine of this class with automatic means for engaging an object at one side and pressing it against a wheel at the opposite side for raising said object;

Sixth, to provide a machine of this class which will operate effectively on a substantially rough surface object; and Seventh, to provide a machine of this class which is very simple and economical of construction, easily applied to conventional trucks, efficient and durable.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a top or plan view of my loading machine showing it connected with a truck platform shown fragmentarily and showing an object in the process of transferring from the machine onto the truck by dash lines; Fig. 2 is a side elevational view of my loading machine showing by dash lines various positions of an object in the process of being loaded; Fig. 3 is a fragmentary side elevational view of my machine taken from the line 3—3 of Fig. 1 and showing a flexible object such as a bag in the process of being raised in varying positions; Fig. 4 is an enlarged sectional view taken from the line 4—4 of Fig. 2 showing some of the parts and portions in elevation to facilitate the illustration; Fig. 5 is a fragmentary enlarged sectional view taken from the line 5—5 of Fig. 2 and Fig. 6 is an enlarged sectional view taken from the line 6—6 of Fig. 2.

Similar characters of reference refer to similar parts and portions throughout the several views of the drawing.

The wheels 1 and 2, shaft 3, hubs 4 and 5, collars 6, 7, 8 and 9, hub member 10, spring pick-up members 11, spring pick-up member shoes 12, sprockets 13, chain 14, supporting beams 15 and 16, platform frame 17, conveyor 18, platform 19, guards 20, small wheels 21, and hitch member 22 constitute the principal parts and portions of my loading machine.

The wheels 1 and 2 are supporting wheels which are positioned from two to three feet apart according to what they are to be used for and are provided with a plurality of spokes 1a and 2a. It will be here noted that there are twice as many spokes in the wheel 2 as there are in the wheel 1 as the object to be raised is pressed over against the spokes of the wheel 2 and the spokes serve to help raise the object, particularly where the object to be raised is flexible the spokes should be close together as shown best in Fig. 3 of the drawing. These spokes are secured at their inner ends in hubs 4 and 5 which are revolubly mounted on the shaft 3. It will be here noted that the shaft 3 is provided with a bend at 3a as shown best in Figs. 4 and 6 of the drawing so that the end is at an angle relatively to the main portion on which the wheels are mounted and revolubly mounted on this angular portion is a hub member 10 which is supported thereon in relative relation by means of a collar 9 secured to the angular portion of said shaft 3. This hub 10 is provided with a flange 10a to which is secured a plurality of spring pick-up members 11 which are made of spring plate and curved substantially as shown best in Fig. 4 of the drawing. There are two of these spring members positioned between each spaced pair of spokes in the wheel 1 and they are held in the proper spaced relation by means of an extended stop member 1b which extends outwardly from the spokes and is adapted to fit between two of said spring members for holding said spring members in certain relative positions to the spokes as shown best in Fig. 2 of the drawing. These spring pick-up members 11 are provided at their extended ends with spring pick-up member shoes 12 which are concavo-convex members, preferably metallic, designated 12a provided with a rubber or other similar sole portions 12b as shown best in Fig. 5 of the drawing, the sole portion being adapted to engage the object to be raised with the revolution of the wheel 1 in its contact with the ground. It will be here noted that by reason of the shaft end being on an angle and therefore the hub being on an angle the spring members at their extended ends on which the shoes are mounted extend through between the spokes of the wheel 1 at the lower side and their extended ends are outwardly of the spokes at the opposite side as shown best in Fig. 4 of the drawing so that the ends of the spring 11 tend to bring pressure upon the object to be raised during a portion of their revolution and release the same when the object is raised to certain position. Secured to the shaft 3 inwardly of the hubs 4 and 5 are the beams 15 and 16 which beams 15 and 16 are secured to the shaft by means of collar members 6 and 7 secured to the shaft by means of pins 6a and 7a as shown best in Fig. 4 of the drawing. Thus it will be noted that the shaft is secured rigidly to the beams by means of these collars 6 and 7 and the wheels 1 and 2, sprockets 13 and hubs 10 revolve on the shaft 3. These beams 15 and 16 extend forwardly some distance from the shaft 3 as shown best in Figs. 1 and 2 of the drawing. Positioned on the shaft 3 between the hub 4 and the collar 7 and secured to the hub 4 is a sprocket wheel 13 on which is mounted a chain 14. This chain 14 is mounted on another sprocket 14a positioned on the conveyor frame by means of a shaft 18f. Positioned between the beams 15 and 16 at their forwardly extending ends is a platform frame 17 which is rectangular in shape and extends upwardly and supports a platform 19 at its upper end as shown best in Fig. 2 of the drawing. This platform 19 is adapted to receive the object to be raised and from this platform the object is shifted over onto the main truck as shown by dash line in Fig. 1 of the drawing, the platform being provided with a guard rail 19a on the side opposite from the truck and also on the front side at 19b. The frame 17 extends downwardly below the beams 15 and 16 and on the lower end are supported guards 20 which are provided with outwardly turned ends 20a as shown best in Fig. 1 of the drawing which provide curved ends for the entrance of the object when passing the loader over the ground over said objects. Secured at the front end of the frame outwardly of the guard member 20 are the wheels 21, which are small wheels which are adapted to engage the ground in case there are ridges or other objects so that the frame does not dig into the ground, but is slightly raised to go over irrigation ridges or other uneven surfaces of ground. The loading machine is secured to the truck which drives the same by means of a pipe 22 which is secured to the truck platform and extends outwardly and mounted on the beams 15 and 16 are brackets 16a which are secured to the beams and extend downwardly and through which the pipe 22 extends and provided with a pin 16b for holding the loading machine in position on this pipe 22.

Secured to the shaft 3 inwardly of the collars 6 and 7 are conveyor supporting beams 18a which extend forwardly on an angle and are secured to the rear side of the platform 19 as shown best in Fig. 2 of the drawing. Journalled on the upper side of these beams 18a just forwardly of the shaft 3 is conveyor shaft 18b on which is mounted chain sprocket 18c shown best in Fig. 2 of the drawing upon which are mounted chains 18d. The upper ends of these chains are mounted on sprockets 18e which are mounted on the shaft 18f, it being noted that the shaft 18f is journalled on the lower side of the beam 18a, while the shaft 18b is mounted on the upper side, all as shown best in Fig. 2 of the drawing. Mounted on these beams 18a are upwardly extending supports 18g on the sides of which are provided guards 18h and on the upper portion are provided guards 18j which form guards and guides for the object to be loaded as shown best in Fig. 2 of the drawing.

The operation of my loading machine is substantially as follows:

The machine is supported on the hitch member 22 in the form of a pipe extending out from the operating truck T shown in dash lines in Fig. 1 of the drawing, so that the loading machine is pivotally connected with the truck on a horizontal axis and is driven thereby. The machine is driven so that it straddles with the wheels and with the guards 20a the object to be loaded. The members 11 together with the shoes 12 extend between the spokes of the wheel 1 and engage the object to be loaded at the lower side with spring tension and thrust it against the wheel 2 including the spokes 2a and with the revolution of the wheel 2a and the spring members 11 and shoes 12, the object is raised by the wheel and the shoe 12 until it comes over into substantial engagement with the conveyor 18 at which point it is released by the position of the shoes 12 extending outwardly out of engagement with the object because of the angle of the shaft 3. The revolution of the wheel 1 on the shaft 3 carries with it the sprocket 13. This sprocket 13 operates a chain 14 which operates the sprocket 14a on the shaft 18f which operates the conveyor chains 18d which carry the object to be conveyed upwardly and land it upon the platform 19 after which it is shifted manually onto the truck T.

It will be here noted that the wheel 2 may be provided with double the amount of spokes as shown in Fig. 3 of the drawing particularly when used for picking up flexible objects such as bags of grain or the like.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a loading machine, a platform pivotally connected at its forward end at one side with the forward portion of a truck, a shaft secured in connection with said platform, a pair of ground engaging platform supporting wheels in spaced relation revolubly mounted on said shaft, a hub revolubly mounted on said shaft at an angle to the main portion of its axis, spring members secured to said hub at their inner ends and a portion of them extending between the spokes of said wheel at their extended ends, sprockets secured to one of said wheels, a conveyor mounted on said platform with one end extending between said wheels, a chain connecting said sprocket wheel with said conveyor, and shoe members secured on the extended ends of each of said spring members.

2. In a loading machine of the class described, the combination with a vehicle, of a platform pivotally connected with one side thereof, a pair of spaced ground engaging platform supporting wheels revolubly mounted on said platform at its free end, an elevating conveyor positioned on said platform in operative connection with one of said wheels, a plurality of spring pick-up members operatively connected with one of said wheels and a portion of them extending inwardly between the spokes of said wheels, said spring pick-up members being supported in angular relation with the axis of said wheel and revoluble with said wheel.

3. In a loading machine of the class described, the combination with a vehicle, of a platform pivotally connected with one side thereof, a pair of spaced ground engaging platform supporting wheels revolubly mounted on said platform at its free end, an elevating conveyor positioned on said platform in operative connection with one of said wheels, a plurality of spring pick-up members operatively connected with one of said wheels and a portion of them extending inwardly between the spokes of said wheels, said spring pick-up members being supported in angular relation with the axis of said wheel and revoluble with said wheel, including a hub member revoluble with said wheel provided with a flange for supporting said spring pick-up members at their inner ends.

4. In a loading machine of the class described, the combination with a vehicle, of a platform pivotally connected with one side thereof, a pair of spaced ground engaging platform supporting wheels revolubly mounted on said platform at its free end, an elevating conveyor positioned on said platform in operative connection with one of said wheels, a plurality of spring pick-up members operatively connected with one of said wheels and a portion of them extending inwardly between the spokes of said wheels, said spring pick-up members being supported in angular relation with the axis of said wheel and revoluble with said wheel, including a hub member revoluble with said wheel provided with a flange for supporting said spring pick-up members at their inner ends, said elevating conveyor including spaced chains and cross bars secured to said chains.

5. In a loading machine of the class described, a wheel supported platform connected to and adapted to be propelled by a driven vehicle, resilient pick-up members in connection with one of said wheels positioned on an angle so that some of said members extend inwardly between the spokes of one of said wheels for engagement with an object to be picked up for pressing it against the other wheel, said means including a shaft with an angular portion outwardly of said wheel and a flanged hub for supporting said spring pick-up members positioned on the angular portion of said shaft.

6. In a loading machine of the class described, a wheel supported platform connected to and adapted to be propelled by a driven vehicle, resilient pick-up members in connection with one of said wheels positioned on an angle so that some of said members extend inwardly between the spokes of one of said wheels for engagement with an object to be picked up for pressing it against the other wheel, said means including a shaft with an angular portion outwardly of said wheel, a flanged hub for supporting said spring pick-up members positioned on the angular portion of said shaft and an elevating conveyor in operative relation with one of said wheels and said platform and operable by said wheels.

7. In a loading machine of the class described, a wheel supported platform connected to and adapted to be propelled by a driven vehicle, resilient pick-up members in connection with one of said wheels positioned on an angle so that some of said members extend inwardly between the spokes of one of said wheels for engagement with an object to be picked up for pressing it against the other wheel, said means including a shaft with an angular portion outwardly of said wheel, a flanged hub for supporting said spring pick-up members positioned on the angular portion of said shaft and an elevating conveyor in operative relation with one of said wheels and said platform and operable by said wheels, and shoe means mounted on the extended ends of said pick-up members at their inner extremities.

8. In a loading machine of the class described, a wheel supported platform connected to and adapted to be propelled by a vehicle, yieldable pick-up members mounted in connection with one of said wheels at an angle thereto so that some of their extended ends pass through between the spokes of said wheels, while the other members extend outwardly at the opposite side of said wheel, each of said spring pick-up members provided with resilient shoe members positioned on the extended ends thereof, another wheel in spaced relation to said wheel and revoluble substantially therewith.

9. In a loading machine of the class described, a wheel supported platform connected to and adapted to be propelled by a vehicle, yieldable pick-up members mounted in connection with one of said wheels at an angle thereto so that some of their extended ends pass through between the spokes of said wheels, while the other members extend outwardly at the opposite side of said wheel, each of said spring pick-up members provided with resilient shoe members positioned on the extended ends thereof, another wheel in spaced relation to said wheel and revoluble substantially therewith, a shaft upon which said wheels are revolubly mounted provided with an angular portion for supporting said resilient spring pick-up members in their certain relation with one of said wheels.

10. In a loading machine of the class described, a wheel supported platform connected to and adapted to be propelled by a vehicle, yieldable pick-up members mounted in connection with one of said wheels at an angle thereto so that some of their extended ends pass through between the spokes of said wheels, while the other members extend outwardly at the opposite side of said wheel, each of said spring pick-up members provided with resilient shoe members positioned on the extended ends thereof, another wheel in spaced relation to said wheel and revoluble substantially therewith, a shaft upon which said wheels are revolubly mounted provided with an angular portion for supporting said resilient spring pick-up members in their certain relation with one of said wheels, and a conveyor operatively connected with one of said wheels and supported at its one end by said shaft.

11. In a loading machine of the class described, a wheel supported platform connected to and adapted to be propelled by a vehicle, yieldable pick-up members mounted in connection with one of said wheels at an angle thereto so that some of their extended ends pass through between the spokes of said wheels, while the other members extend outwardly at the opposite side of said wheel, each of said spring pick-up members provided with resilient shoe members positioned on the extended ends thereof, another wheel in spaced relation to said wheel and revoluble substantially therewith, a shaft upon which said wheels are revolubly mounted provided with an angular portion for supporting said resilient spring pick-up members in their certain relation with one of said wheels, a conveyor operatively connected with one of said wheels and supported at its one end by said shaft, and a platform at the opposite end of said conveyor.

GRATTAN G. BENNETT.